Patented Feb. 1, 1949

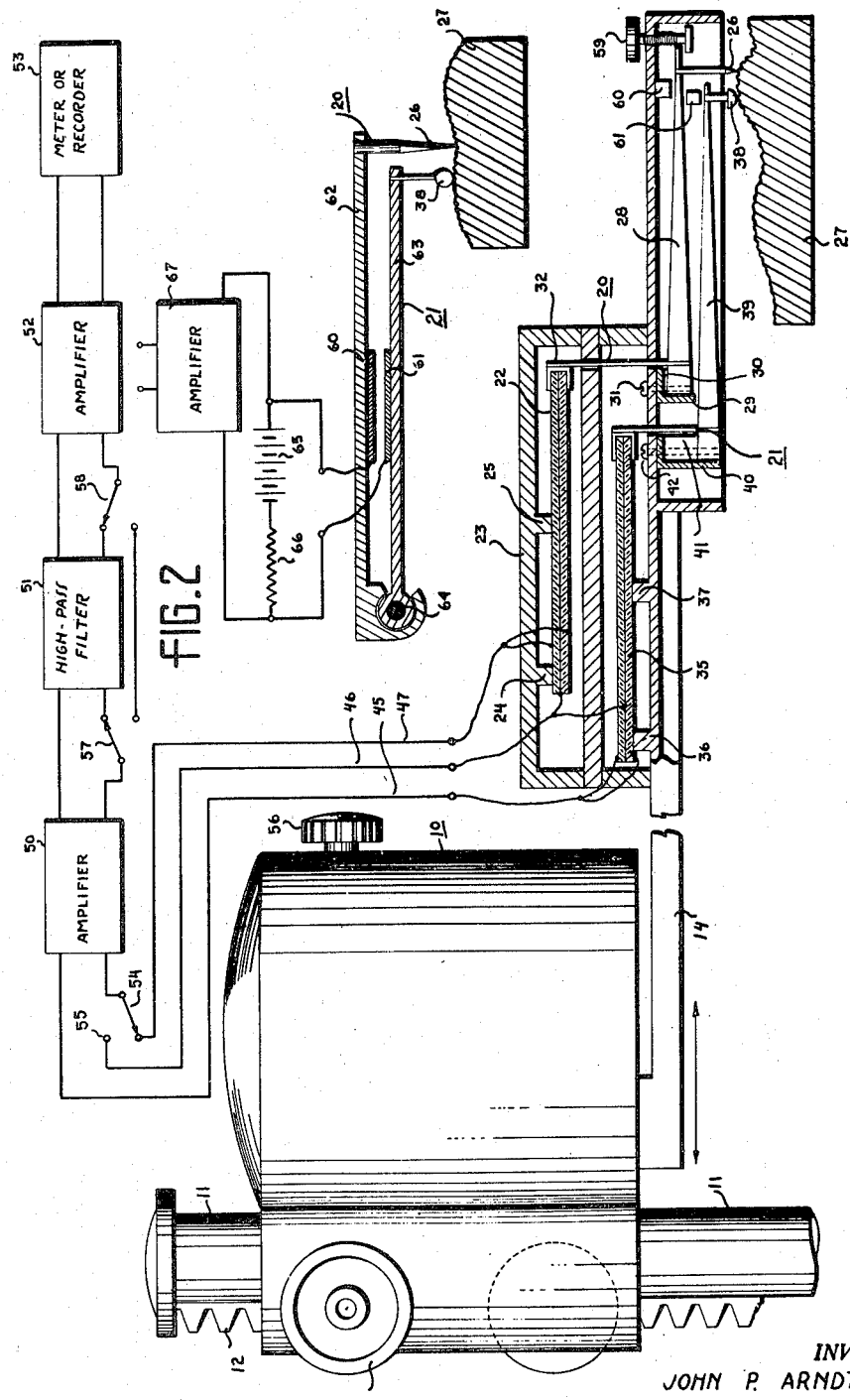

2,460,726

UNITED STATES PATENT OFFICE 2,460,726

SURFACE ROUGHNESS MEASURING DEVICE

John P. Arndt, Jr., Euclid, Ohio, assignor to The Brush Development Company, Cleveland, Ohio, a corporation of Ohio Application January 11, 1943, Serial No. 471,967

1 Claim. (Cl. 73—105)

My invention pertains to the measuring of surface roughness and more particularly to a new and improved electrical pickup.

An object of my invention is to provide a new and improved pickup for a surface roughness measuring device.

Another object of my invention is to provide a more useful and flexible pickup for a surface measuring device.

It is another object of my invention to provide a stylus system which will produce an electrical output corresponding to either one or both of two ranges of "wave length" of surface irregularities.

A further object of my invention is to provide a dual stylus system for making a pickup selectively responsive to either one or more of several ranges of "wave lengths" of surface irregularities.

Other objects and a fuller understanding of my invention may be had by referring to the following description and claims, taken in conjunction with the drawings, in which:

Figure 1 illustrates schematically and in block diagram form an embodiment of my invention.

Figure 2 illustrates another form of my invention.

In the field of measuring surface irregularities it has been recognized that there are several types of surface irregularities. For example, a surface may have waviness due to machining operations and the waves may have a peak to trough distance on the order of thousandths to several hundreds of an inch; and the surface may also have minute surface roughness on the order of millionths of an inch.

In present devices a sharp stylus is caused to traverse a surface the measure of whose roughness is desired, and the sharp stylus follows as closely as possible the minute irregularities thereby taking on a vertical motion in accordance with the extent of the vertical height of the roughness. This vertical motion can be used in a number of systems, such for example: as to bend a piezoelectric crystal, actuate a magnetic pickup, vary the space between condenser plates, or actuate a mirror on which is focused a beam of light, or any number of other systems from which an amplification and an indication of the excursions of the stylus can be had. When the surface to be measured has several types of roughness with amplitudes of different orders of magnitude a difficulty arises. This difficulty is that the vertical excursion of the stylus due to surface waviness may be many times the vertical excursion due to the surface roughness. In a recording system using a light beam reflected from an oscillating mirror onto a moving strip of film, this difficulty is great because the reflected light beam may wander off of the film due to the wide oscillation of the mirror resulting from the relatively large vertical excursion of the stylus due to surface waviness. This problem is also present in electrical pickup systems but may not be quite as serious as in the purely mechanical pickup system mentioned above, as the electrical amplifier may have a low frequency cut-off which reduces the voltage passed to the recording system due to low frequency actuation of the stylus. The recording system then would pass with full amplitude only the alternating signals which had a frequency above the cut-off frequency of the electrical system, and a pen recorder such as is used to make a permanent inked picture of the surface roughness, would be actuated mainly in accordance with the higher frequency, and these higher frequencies would correspond to the minute surface irregularities. However when the amplitude of the waviness is many times the amplitude of the roughness, it is difficult to provide sufficiently sharp low frequency cut-off to prevent some record of waviness from appearing on the chart.

My invention is useful when measuring small amplitude roughness, even though there is no waviness, as the opposing effect of the second stylus system is useful to cancel out low frequency vertical vibration components of the pickup with respect to the specimen which may occur due to building vibration.

In Figure 1, I show a drive head 10 which is supported on a shaft 11 having a rack 12 on one side thereof. The shaft 11 is supported by a heavy base (not shown). The drive head has an adjustment wheel 13 which, when turned, operates a gear wheel having teeth which mesh with the teeth on the rack 12 to adjust the vertical elevation of the head 10 with respect to the base which supports the shaft 11. A pickup arm 14 extends from the bottom of the drive head 10 and is reciprocated by a motor (not shown) which is in the drive head. It is desirable that the arm 14 be held by the drive head 10 against up and down motion so that there will be no relative motion between the arm 14 and the head 10 except the horizontal reciprocal motion which the head imparts to the arm. At one end of the pickup arm 14 there is shown, in much exaggerated size, two piezoelectric styli systems 20 and 21.

The stylus system 20 is adapted to establish a voltage in accordance with all surface irregularities including the minute surface roughness, and the stylus system 21 is adapted to establish a voltage in accordance with only the larger surface irregularities, such as waviness.

The stylus system 20 comprises a bender multiplate type of piezoelectric Rochelle salt crystal 22 which is connected by a cement or other such adhesive to two spaced raised portions 24, 25 of the housing 23, a sharp pointed stylus 26 which is shown in engagement with a specimen 27 whose surface is to be profiled, and a lever system connecting the stylus 26 to the crystal 22. The lever system comprises a lever arm 28 connected at one end to the stylus 26 and at the other end to a pivot comprising torsionally flexible angle piece 29 which is in turn connected to a portion of the arm 14. A spacer 30 is provided between the angle piece 29 and the arm 28, and a screw 31 or other such attaching means is used to connect the arm 28, the spacer 30 and the angle piece 29 to the arm 14. Or, for an alternative construction, the forces in the lever system will be small enough that instead of the screw 31 for connecting various pieces together, an adhesive may be used.

One end of a drive pin 32 is connected to the lever arm 28 at a point between the stylus 26 and the pivot piece 29, and the other end of the pin 32 is connected to an end of the crystal 22.

The stylus system 21 is substantially a duplicate of the system 20, and comprises a similar crystal unit 35 supported in the housing 23 by two raised portions 36, 37 to which it is cemented, a stylus 38 in engagement with the specimen 27 and having a blunt or rounded tip which is large compared to the sharp tip of the stylus 26, and a lever system connecting the stylus 38 to the crystal 35. The stylus system comprises a lever arm 39 connected at one end to the stylus 38 and at the other to a pivot comprising a torsionally flexible angle piece 40 which is in turn connected to the arm 14. A spacer 41 is provided between the angle piece 40 and the lever arm 39, and a screw 42 or other means is used to connect all of the pieces together.

When a specimen such as 27 is to be tested it is placed under the styli 26, 38, and the drive head 10 is lowered by turning the adjustment wheel 13, thereby lowering the pick-up arm 14, the housing 23, and the styli until the ends of the styli touch the specimen. The apparatus is then lowered a little bit more to push the styli 26, 38 and their lever arms upwardly with respect to the housing 23, thereby slightly bending and stressing the crystals 22, 35. Due to the stiffness of the crystals there will now be a slight bias of the styli toward the specimen. Upon starting the motor in the drive head 10, the styli 26, 38 will be reciprocated across the specimen.

Due to the comparatively large area of the tip of the stylus 38 it will not follow the minute roughness but will only be actuated vertically by the waviness, thereby stressing the piezoelectric crystal 35 in accordance with the surface waviness, and the crystal will generate a voltage between the output wires 45, 46 which is in accordance with the surface waviness. At the same time, due to its small sharp tip, stylus 26 will follow not only the surface waviness but also the surface roughness, thereby stressing the piezoelectric crystal 22 in accordance with the total vertical excursions of the stylus 26, and the crystal 22 will generate a voltage between the output wires 46, 47 which is in accordance with surface waviness and surface roughness. The output from the two crystals are connected in opposition, the wire 46 being common to both, so that the outputs due to waviness substantially cancel thereby leaving substantially only the output due to roughness. That the output due to waviness does not cancel entirely is due to the fact that the two styli do not occupy exactly the same position on the specimen, but the cancellation effected will be enough to prevent a pen of a pen recorder from moving off of the strip of paper on which it is recording the profile of the surface roughness. One method of positioning the two styli close together is to provide the large blunt stylus with a hole extending through it, and to have the sharp stylus extend through the hole and contact the specimen. The output between the wires 45, 47 which corresponds to surface roughness is amplified at the amplifier 50, and the amplified output is fed through the high pass filter 51, to another amplifier 52 (if necessary), and then to a utilizing device 53, such for example as an R. M. S. meter or a pen recorder. The speed of the trace of the styli across the specimen, and the low frequency cut-off of the amplifiers and the filter 51 can be designed so that very little signal corresponding to waviness or vibration which may pass to the amplifier 50 due to lack of balance in the two styli systems is passed to the utilizing device.

When it is desired to record on the utilizing device 53 an output corresponding only to surface waviness, the switch 54 is thrown connecting terminal 55 to the input of the amplifier 50, which now receives a signal from the wires 45, 46 which is in accordance with the voltage generated by the crystal 35. Due to the low frequency cut-off of the amplifiers 50, 52 and especially due to the filter 51, it is necessary to either increase the speed of the trace of the stylus 38 across the specimen by turning the speed control knob 56, or by cutting out the filter 51. Cutting out filter 51 can be done by throwing switches 57, 58. Obviously, both cutting out the filter and increasing the speed can be done if it is desired. I provide a screw 59 in threaded engagement with the arm 14 for raising the stylus 26 off of the surface of the specimen 27 to prevent damage to the stylus and to the specimen during rapid tracing.

By rigidly supporting the pickup arm 14 in the drive head 10 the two styli do not have to support the weight of the pickup, and therefore the force pressing against the specimen will be small, thus avoiding damage to soft and delicate materials. Two stops 60 and 61 are provided for limiting the extent to which the styli 26, 38 can be displaced. The stops 60, 61 may be small plastic or metal pieces connected to the sidewall of the arm 14.

Although I have described my invention in regard to a piezoelectric type of pickup, it is to be understood that within the scope of my invention there are many other types of pickups, such for example as moving coil, condenser, variocoupler, unbalanced magnetic bridge.

One such type is shown in Figure 2 in which there is a first condenser plate 60 connected to the arm 62 which together with sharp stylus 26 forms the stylus system, indicated generally by the reference character 20, and a second condenser plate 61 connected to the arm 63 which together with blunt stylus 38 forms the stylus system indicated generally by the reference character 21. The two arms 62, 63 are pivoted about the same axis 64, and are spaced far enough apart that there will be a small space between the condenser plates 60, 61. A battery 65 establishes a charge on the condenser 60, 61, and there is a resistor 66 in series with the battery. The output circuit from the condenser 60, 61 is supplied to the amplifier 67, and the output from the amplifier 67 may be fed to a meter or a recorder.

When the two styli 26, 38 move in accordance with surface waviness or vibration and stylus 26 is not moved in accordance with roughness the spacing between the two condenser plates 60, 61 will not change appreciably, and therefore there will not be a substantial signal output. When the stylus 26 moves in accordance with surface roughness there will be a differential motion between the plates 60 and 61, and consequently there will be a signal output.

Instead of using the system shown in Figure 2 it is also possible to use the condenser 60, 61 to modulate a signal, and to utilize the modulated signal for obtaining an indication of the surface roughness.

I have described my invention with a certain degree of particularity with regard to Figure 1, and briefly with regard to Figure 2. It is to be understood, however, that many other systems can be devised which come within the scope of my invention.

I claim as my invention:

In a roughness measuring device for use on a specimen having surface waviness and surface roughness; an arm; motor means for driving said arm across said specimen; first piezoelectric crystal generator means mounted on said arm; a first stylus having a tip small enough to follow surface waviness and too large to follow surface roughness; first lever means connecting said first stylus to said first generator means for applying to said first generator means motions of small amplitude and large force compared to the motions and force applied to said first stylus as said first stylus is moved across said specimen thereby establishing an electrical quantity in accordance with the waviness induced vertical excursions of said first stylus; second piezoelectric crystal generator means similar to said first generator means mounted on said arm; a second stylus having a smaller tip able to follow the surface roughness as well as the surface waviness, said second stylus being located on said specimen near said first stylus; second lever means connecting said second stylus to said second generator means for applying to said second generator means motions of small amplitude and large force compared to the motions and force applied to said second stylus as said second stylus is moved across said specimen thereby establishing an electrical quantity in accordance with the waviness and roughness induced vertical excursions of said second stylus, the electrical quantity established in accordance with waviness induced vertical excursions of said second stylus being substantially equal in magnitude to and substantially in phase with the electrical quantity established in accordance with the waviness induced vertical excursions of said first stylus; indicator circuit means including an indicator; first electrical connection means connecting said first generator means to said indicator circuit means for giving on said indicator an indication of surface waviness; second electrical connection means including switch means which upon being closed selectively connect said second generator means to said indicator circuit means simultaneously with said first generator means so that the electrical quantity from said first generator means is substantially 180 degrees out of phase with and substantially cancels the portion of the electrical quantity representing surface waviness from said second generator means whereby there is given on said indicator an indication of surface roughness; speed control means for controlling the speed at which said first and second stylii are driven across said specimen by said motor means whereby when said first generator means alone is connected to said indicator circuit means the speed at which said first stylus is driven across said specimen may be increased; and lifter means connected to said arm for lifting said second stylus up off of said specimen and maintaining said second stylus in said lifted position in order that its tip will not be damaged while said first stylus traces the specimen at high speeds.

JOHN P. ARNDT, Jr.

REFERENCES CITED

The following references are of record in the file of this patent:

UNITED STATES PATENTS

| Number | Name | Date |
| --- | --- | --- |
| 1,976,337 | Firestone et al. | Oct. 9, 1934 |
| 2,016,420 | Engst | Oct. 8, 1935 |
| 2,083,759 | Temple | June 15, 1937 |
| 2,146,442 | Price | Feb. 7, 1939 |
| 2,171,433 | Powers | Aug. 29, 1939 |
| 2,240,278 | Abbott | Apr. 29, 1941 |
| 2,329,084 | Reason | Sept. 7, 1943 |
| 2,335,390 | Crist | Nov. 30, 1943 |
| 2,396,394 | Shaw | Mar. 12, 1946 |